Feb. 27, 1968    D. B. HOOVER    3,371,235
COMPONENT SUPPORT AND INTERCONNECTION ARRANGEMENT
IN A ROTATING RECTIFIER EXCITER
Filed May 12, 1965    4 Sheets-Sheet 1
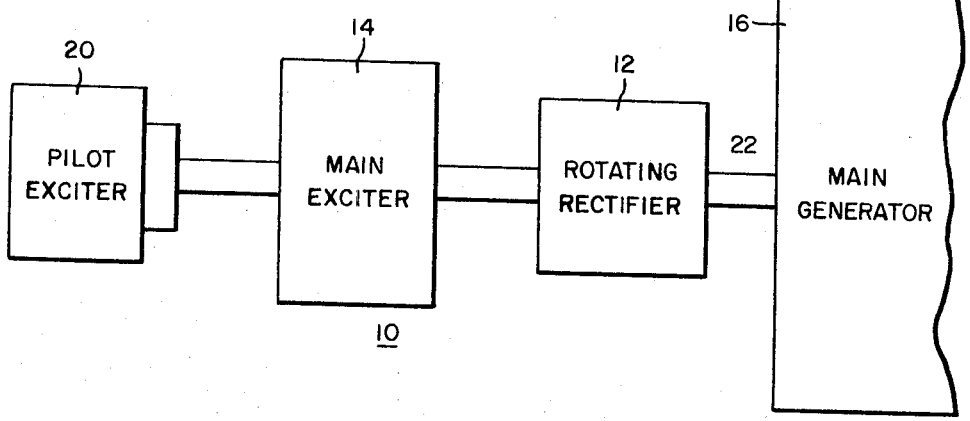
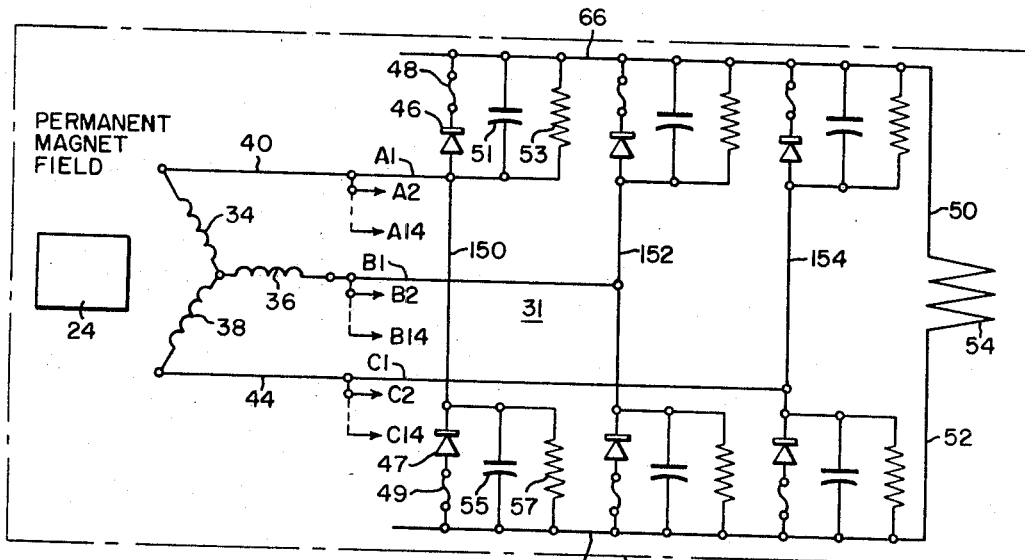
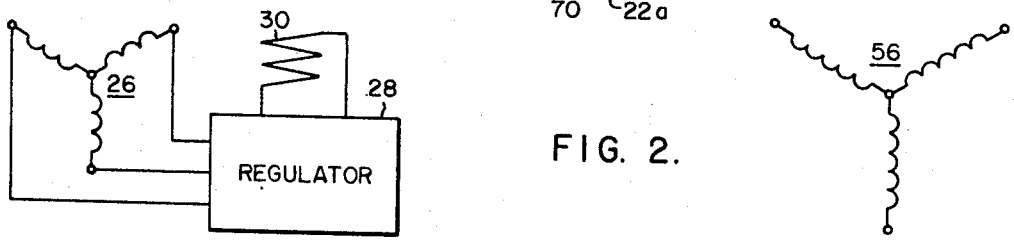
FIG. 2.
WITNESSES:
John L. Chopp
James F. Young
INVENTOR
Dillon B. Hoover
BY E. F. Possessky
ATTORNEY

United States Patent Office 3,371,235
Patented Feb. 27, 1968

3,371,235
COMPONENT SUPPORT AND INTERCONNECTION ARRANGEMENT IN A ROTATING RECTIFIER EXCITER
Dillon B. Hoover, Edgewood, Pa., assignor to Westinghouse Electric Corporation, Pittsburgh, Pa., a corporation of Pennsylvania
Filed May 12, 1965, Ser. No. 455,206
6 Claims. (Cl. 310—68)

ABSTRACT OF THE DISCLOSURE

A rotating rectifier arrangement for brushless generator excitation in which the rectifying diodes and fuses are mounted on insulated wheels on the shaft and arranged so that the connections are simplified and the conductors can be adequately supported against rotational forces.

---

The present invention relates to brushless AC power generating systems, and more particularly to component support and interconnection arrangements in rotating rectifier exciters which form a part of such systems.

In a rotating rectifier brushless generating system, a pilot exciter and a regulator provide controlled field energization for an alternating current exciter, and the rotating armature of the exciter in turn produces an alternating voltage which is applied to a rotating rectifier physically disposed with the exciter armature on a common shaft. The rectified voltage is then applied to the main generator rotating field winding which is also disposed on the common shaft, and brushless delivery of generator excitation power (which may be as much as 5800 kilowatts or more) is thereby achieved. Usually the pilot exciter has a permanent magnet field and is also driven by the common shaft, but a separate motor generator set, or any other source, can be used for pilot excitation. Efficiency and reliability are achieved through the elimination of maintenance and replacement problems normally associated with brushes, commutators and collection rings.

The rotating rectifier usually comprises a plurality of semiconductor diodes mounted on one or more shaft supported component or diode "wheels" and electrically interconnected in a suitable excitation circuit pattern between the exciter armature and the main generator rotating field winding. In addition, separate fuses are usually provided in electrical series with the respective diodes and the fuses can be disposed on one or more separate component or fuse "wheels" or they can be disposed with the diodes on one or more common component "wheels." Capacitors and resistors often are also employed so as to suppress semiconductor diode voltage spikes during commutation and these components also can be wheel supported alone or in combination with the diodes and the fuses.

The annular space for component support about the shaft and within the rotating rectifier is limited by design considerations. A problem of space utilization is thus created and it becomes more critical as exciter current rating increases because more diodes are then required in the exciter circuit to carry the increased current. Further, it is necessary that all of the components and interconnections be supported for long term circuit operating reliability against centrifugal forces of rotation which can be as much as or more than 6000 to 8000 times the force of gravity. Generally, component support is adequate if the components are braced against radially inwardly facing wheel surfaces and if the interconnecting conductors are relatively stiff (though limitedly deflectable) and securely supported in place. The specific manner in which all of the components are supported and interconnected within the rotating rectifier is determinative of the extent to which these and other problems are resolved.

In accordance with the broad principles of the invention, an arrangement for supporting circuit components in a rotating rectifier of a brushless synchronous generator system comprises component wheel means which includes at least one component wheel supported on the rotating rectifier shaft and which further includes at least two conductive bus rims supported by the wheel or wheels so as to be insulated from the shaft. Conductive heat sink segments are insulatively supported on a radially inwardly facing surface of each rim. A plurality of diodes are in turn supported on and in conductive engagement with the segments. Fuses, and if desired, other components such as capacitors and resistors, are supported in relation to each rim surface. Component interconnections are conveniently made in accordance with the selected excitation circuit pattern and the excitation circuit is completed by phase conductor connections to the segments and by respective conductor connections between the bus rims and the field winding.

It is, therefore, an object of the invention is to provide a novel component support and interconnection arrangement in a rotating rectifier exciter wherein efficient wiring space utilization is achieved.

Another object of the invention is to provide a novel component support and interconnection arrangement in a rotating rectifier exciter wherein efficient component support is achieved against forces of rotation.

An additional object of the invention is to provide a novel component support and interconnection arrangement in a rotating rectifier exciter wherein one or more wheels are employed to support the components and wherein each wheel has a rim portion included in the excitation circuit in such a manner as to provide convenient fuse and diode component interconnection.

A further object of the invention is to provide a novel component support and interconnection arrangement in a rotating rectifier exciter in which fuses, diodes and other circuit components are jointly supported on a single component wheel or on each of a plurality of component wheels in such a manner as to provide efficient space utilization and efficient support against the forces of rotation.

These and other objects of the invention will become more apparent upon consideration of the following detailed description along with the attached drawings, in which:

FIGURES 1 and 2 respectively show mechanical and electrical schematic diagrams of a brushless synchronous generating system in which a rotating rectifier exciter is employed;

Figure 3:
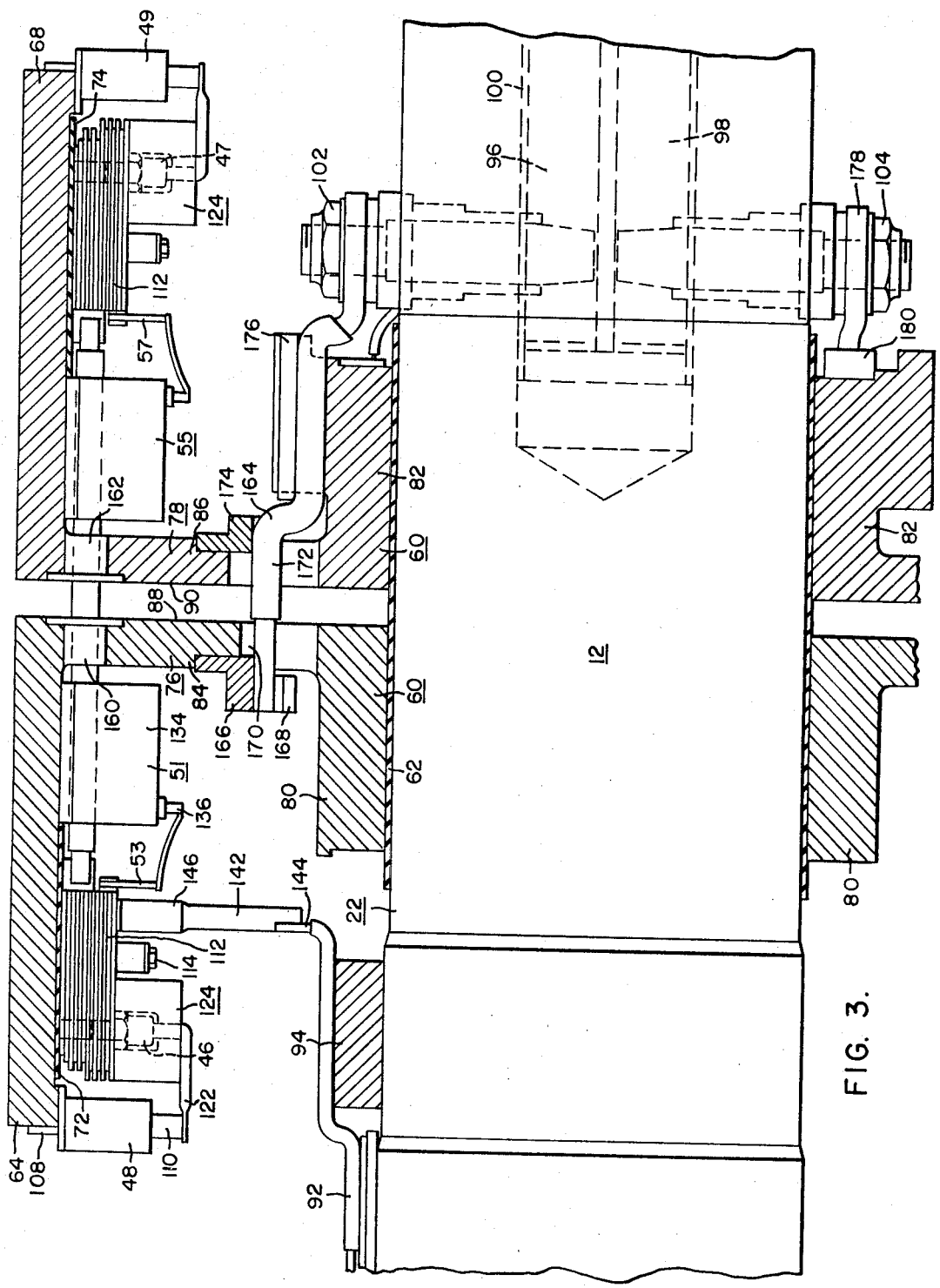
FIG. 3 shows a rotating rectifier portion of the system shown in FIG. 1 and constructed in accordance with the principles of the invention.

More specifically, there is shown schematically in FIG. 1, an AC power generating system 10 in which there is employed a rotating rectifier 12 and a main alternating current exciter 14 which provides field energization for a main generator 16 through the rotating rectifier 12. The main exciter 14 receives its field energization from a pilot exciter 20. Preferably, a mechanically common shaft 22 is provided for the power system 10, and when rotated by a suitable source of mechanical power the power system 10 is electrically self-started and self-sustained for power generation by means of the pilot and main exciters 20 and 14.

In the circuit schematic of FIG. 2, the shaft 22 is shown in dot-dash outline 22a so as to indicate those electrical and magnetic components which undergo rotation. Thus, a permanent magnet field member 24 which can be of overhung construction (not shown) from the associated end of the shaft 22 is electromagnetically related to a stationary armature 26 of the pilot exciter 20 so that a pilot voltage (usually AC) is applied to a regulator 28 when the shaft 22 is rotated. If the overhung construction is employed for the permanent magnet field member 24, the stationary armature 26 can be disposed within the field member 24 and generally in line with the axis of the shaft 22.

The regulator 28 preferably includes rectifying means and is suitably organized to control the DC voltage applied to a stationary field winding 30 of the main exciter 14. The voltage control is based in any well known manner upon main generator voltage and feedback or other information.

A main excitation circuit 31 includes a rotating armature 32 which is electromagnetically related to the field winding 30 of the main exciter 14, and in this instance the exciter armature 32 generates three-phase AC voltage in respective phase windings 34, 36 and 38. Other winding arrangements can of course be employed according to the exciter voltage generating characteristics desired.

The electrical output of the armatures 34, 36 and 38 is transmitted in the excitation circuit 31 through phase conductors 40, 42 and 44, respectively, through phase lead branches $A_1$–$A_{14}$, $B_1$–$B_{14}$ and $C_1$–$C_{14}$, and through a rectification circuit including forward and reverse polarity diodes 46 and 47 (only representatively shown) and associated fuses 48 and 49 (only representatively shown). Capacitors 51 and 55 and resistors 53 and 57 are connected across some or all of the diodes and fuses and are physically supported along with the diodes and the fuses in the rotating rectifier 12. Rectified or DC voltage is thus applied through excitation circuit conductors 50 and 52 to the field winding 54 on the rotor of the main generator 16. Generated power voltage appears across a stationary main generator armature winding 56. If desired, double or plural armature exciter circuits can be provided by series connected AC exciter and rotating rectifier combinations in the excitation circuit 31.

The description so far presented has related primarily to overall system structure and function and thus provides a perspective from which the present invention can be understood. It is apparent that the system 10 is a "brushless" system since there is no requirement for brushes, commutators, collector rings or the like. That is, rectification of the alternating current output of the main exciter 14 is accomplished on the shaft 22 by means of diode components disposed in the rotating rectifier 12.

Figure 3A:
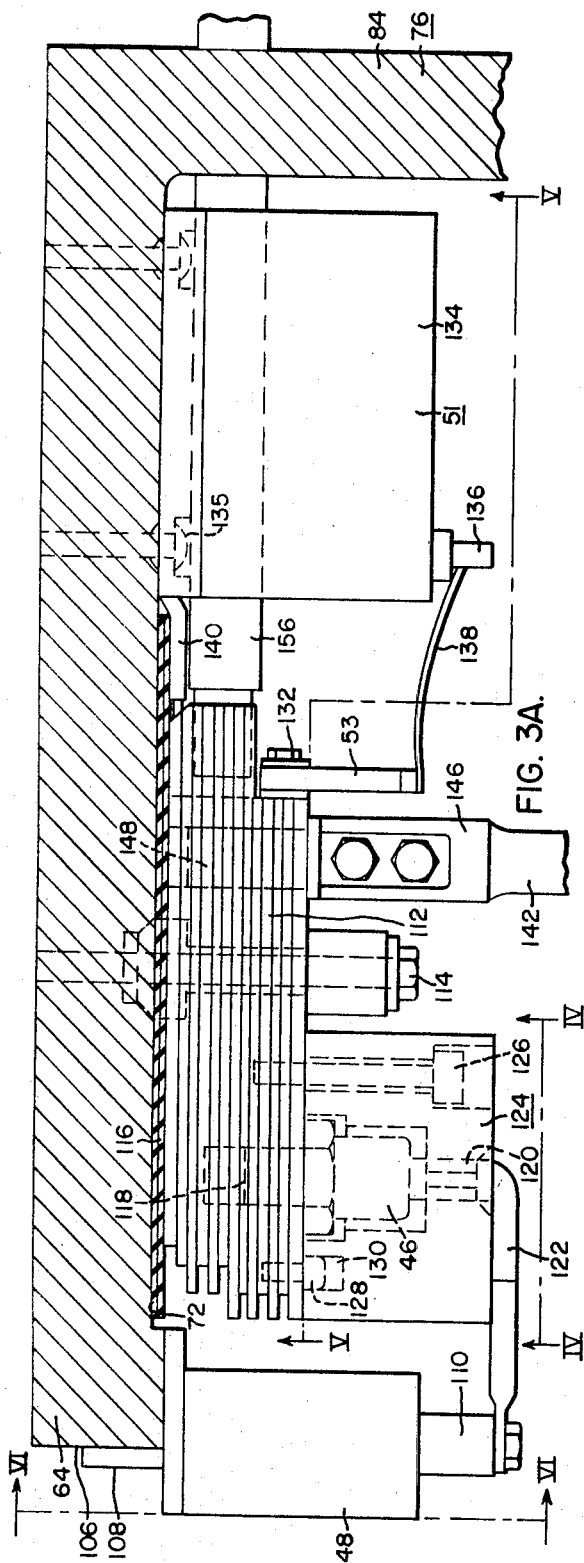
FIG. 3A shows an enlarged fragmentary view of a rim portion of the structure shown in FIG. 3.
Figure 5:
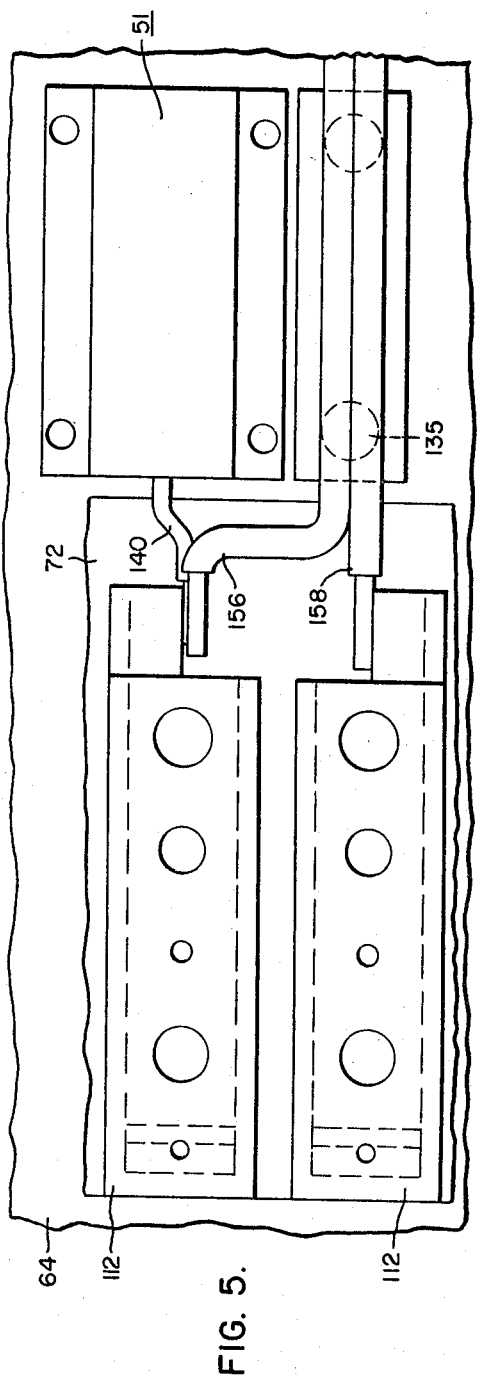
FIG. 5 shows a top plan view of two heat sink segments and a capacitor unit employed in the rotating rectifier, as taken along the reference line V—V of FIG. 3A.
Figure 4:
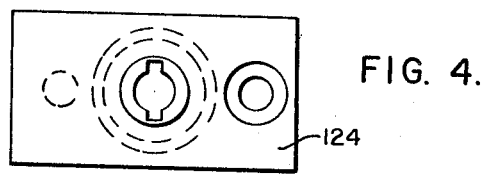
FIG. 4 shows a top plan view of an insulative diode support block employed in the rotating rectifier, as taken along the reference line IV—IV of FIG. 3A.

In accordance with the present invention, the rotating rectifier 12, as shown in greater physical detail in FIGS. 3 and 3A, comprises wheel means 60 supported on the shaft 22 by means of a suitable keying arrangement (not shown) with a tubular insulative member 62 located therebetween. The wheel means 60 is provided with a positive circumferentially extending bus rim 64 (corresponding to interconnecting diode conductor 66 in FIG. 2) and a negative circumferentially extending bus rim 68 (corresponding to diode interconnecting conductor 70 in FIG. 2). Each of the bus rims 64 or 68 is provided with a radially inwardly facing surface 72 or 74 for the purpose of supporting components used in the rectifier circuit.

Preferably, separate wheel members 76 and 78 form the wheel means 60 and the bus rims 64 and 68 respectively are provided on the wheels 76 and 78. The outer diameter of the wheels 76 and 78 is kept as small as possible in order to minimize rotational windage losses and additionally to minimize rotational forces on the components supported by the wheels.

Each wheel 76 or 78 includes a hub portion 80 or 82 fitted about the insulative tube 62 and a radially extending wall member 84 or 86 which connects the hub portion 80 or 82 with the bus rim 64 or 68. In this case, the radial wheel wall 84 or 86 is generally solid but it can be provided with alternate forms such as that of a web (not shown).

The wheel 76 or 78 is thus generally provided with a C-shape in cross-section, as observed in FIG. 3, and radial wall sides 88 and 90 confront each other to place the wheels 76 and 78 in "back-to-back" relation. Alternative wheel arrangements can be employed to dispose the bus rims 64 and 68 in insulative relation to the shaft 22 and in insulative relation to each other. For example, a single hub (not shown) can be employed with suitable additional radial wall structure (not shown) to support and insulate the bus rims 64 and 68. Other variations are also possible, but the illustrated arrangement is the preferred one since it provides good space economy for the components and connections as well as strong and durable securance of the wheel means 60 to the shaft 22.

Exciter connections to the rotating rectifier 12 are made by means of phase leads 92 which extend along the shaft 22 and are suitably supported thereon. Within the rotating rectifier 12, a phase lead support ring 94 is disposed about the shaft 22 so as to support the phase leads 92 in the manner illustrated in FIG. 3. A plurality of the phase leads 92 are disposed about the shaft 22 and they correspond to the phase lead branches $A_1$–$A_{14}$, $B_1$–$B_{14}$ and $C_1$–$C_{14}$, in FIG. 2.

Generator field connections are made to the rotating rectifier 12 by means of conductors 96 and 98 (corresponding to the conductors 50 and 52 in FIG. 2) disposed in an axially extending shaft cavity 100 and insulated from each other and from the shaft 22. Suitably structured studs 102 and 104 are securely attached respectively to the conductors 96 and 98 and extend radially to the outer periphery of the shaft 22. Preferably, only one stud 102 or 104 is provided for each conductor 96 or 98 and the two studs are preferably disposed in diametrically opposed relation to each other so as to avoid rotational unbalance. The described scheme for making the main generator connections is preferred in the present structure, but in some applications, particularly in relatively small generator systems, it may be desirable to extend conductors along the outer diameter of the shaft 22 for connection to the generator field winding 54.

All of the rectifier circuit components are preferably supported in relation to the rim surfaces 72 and 74 as shown in FIG. 3A. Since the arrangement for supporting the components is similar on the two wheels 76 and 78, only the structure associated with the wheel 76 will be described in detail.

The fuses 48 are disposed about the circumference of the bus rim 64 and are attached or bolted in conductive relation to an edge surface 106 thereof by means of respective fuse end plates 108. Each fuse 48 is also provided with a radially inwardly extending terminal 110 for connection to the associated diode 46.

Inwardly from the fuses 48, the diodes 46 (preferably semiconductor diodes) are insulatively supported about the bus rim surface 72 in such a manner as to provide adequately cool diode circuit operation. Thus, the diodes 46 are supported on finned heat sink segments 112 which in turn are supported on a tubular insulative layer 116 and are secured to the bus rim 64 by suitably insulated bolt means 114.

Figure 6:
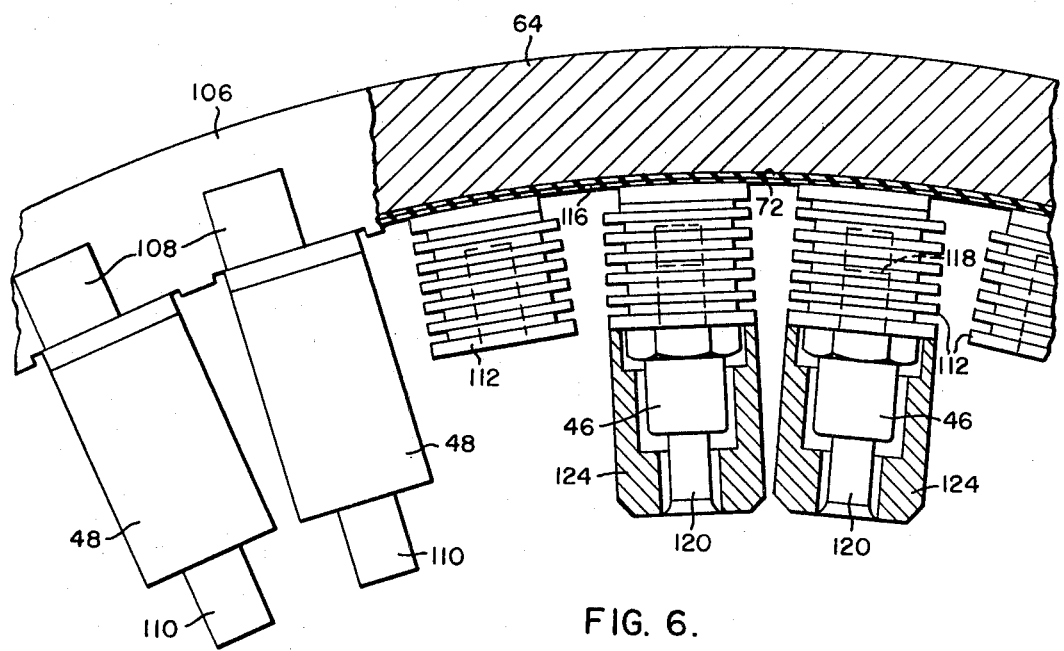
FIG. 6 shows a fragmentary end view of the rotating rectifier with portions broken away, as taken along the reference line VI—VI of FIG. 3A.

As viewed in FIG. 6, a heat sink segment 112 is preferably provided for each diode 46 and the heat sink segments 112 and the diodes 46 are disposed circumferentially about the radially inwardly facing bus rim surface 72 respectively in alignment with the fuses 48 in the axial direction. Heat sink segments of greater arcuate extent or of other geometries can be employed and more than one diode 46 can be supported on each of such heat sink segments. One example would be where three arcuate heat sink segments are provided about the inner rim periphery and all of the diodes 46 associated with each phase A, B or C would be mounted on one of the three arcuate heat sink segments.

Each diode 46 is provided with a stud terminal 118 which is secured in thermal and electrically conductive relation to the associated heat sink segment 112, and further is provided with radially inwardly located terminal means 120 for connection to the terminal 110 of the aligned fuse 48. In this instance, the diode-fuse connection is made by a flexible lead 122 which is supplied as a terminal connector part of the diode terminal means 120.

An insulative block 124 is disposed about the diode 46 and is secured to the associated heat sink 112 by means of a bolt 126 and mating projecting and recess means 128 and 130. The insulative block 124 generally provides side support for the diode terminal 120 and supports the diode connecting means or flexible lead 122 against radially directed outward force as explained more fully in a copending application entitled, "Support Arrangement for Diodes in a Rotating Rectifier Exciter," filed by S. R. Petersen, on Aug. 20, 1964, Ser. No. 390,897, and assigned to the present assignee.

The resistors 53 are also supported in relation to the bus rim 64, and preferably a resistor 53 is associated with every alternate diode 46. The resistor 53 is connected to the associated diode 46 by suitable means such as a bolt 132 extended through one end of the resistor 53 into engagement with the associated heat sink 112.

Similarly, the capacitors 51 are also supported in relation to the bus rim 64 and are associated with the same alternate diodes 46 to form a shunt capacitance path across the diodes 46 to the bus rim 64. Each capacitor 51 can comprise a single capacitor unit or a plurality of capacitor units disposed in a conductive casing 134 which is bolted in conductive and supportive relation to the bus rim surface 72 as indicated by the reference character 135. The capacitor casing 134 is thus placed in intersurface conductive engagement with the bus rim surface 72, and a casing terminal 136 (at bus rim potential) is disposed for connection to a generally stiff but flexible lead 138 which extends from the resistor 53 generally in the shaft axial direction toward the capacitor casing 134. Another capacitor terminal (not shown) is connected to the associated heat sink segment 112 by suitable insulated connecting means 140. Suitable bolt or solder means (not shown) are employed to establish the conductive connection between the capacitor connecting means 140 and the associated heat sink segment 112.

In summary of the interconnection of the rectifier circuit components, a fuse 48 and a diode 46 are connected in series between the bus rim 64 and a heat sink 112 in each phase branch of the excitation circuit 31 (FIG. 2), and a resistor 53 and a capacitor 51 are respectively connected in parallel with the fuse-diode subcircuit between the bus rim 64 and every other heat sink 112. Since all of the components are supported against the radially inwardly facing bus rim surface 72, solid component support is provided against the forces of rotation. The character of the interconnection of the rectifier circuit components results in efficient use of limited space.

In some cases, additional rectifier circuit components (not shown) may be employed in a brushless generator system and these also can be mounted on the wheel means 60 if desired. In other cases, it may be desirable for one reason or another to eliminate certain components such as the capacitors or the resistors (particularly in relatively low power generating systems) or to mount such components on separate wheels.

To connect the phase leads 92 in the excitation circuit, a radially extending and relatively stiff conductor 142 is connected to each phase lead 92 by means of a connector coupling 144. The conductor 142 is in turn connected to a radially aligned heat sink 112 by means of another connector coupling 146 which is suitably attached to the heat sink 112 by a welded stud 148 or the like.

Corresponding heat sink segments 112 on the rims 64 and 68 are interconnected to establish each cross connection 150 or 152 or 154 (FIG. 2) in each of the various phase lead branches. For this purpose, insulated conductors 156 and 158 are suitably clamped to the heat sink segments 112 on the bus rim 64 and are extended through openings 160 and 162 in the wheel walls 84 and 86. The conductors 156 and 158 are similarly attached to the corresponding heat sink segments 112 on the bus rim 68. Preferably, the insulated conductors 156 and 158 are extended in pairs through the openings 160 and 162 so as to make use of the space between the successive circumferentially spaced capacitors 51 and 55. The fact that the wheels 76 and 78 are placed in "back-to-back" relation as previously described facilitates the establishment of the connections 150 and 152 and 154 through the use of the insulated conductors 156 and 158.

The positive bus rim 64 is connected to the positive stud 102 by means of an insulated conductor 164 which is clamped to the wheel wall 76 by means of a clamping ring 166 and a separate clamp member 168. The ring 166 is bolted to the wheel wall 84, and the conductor 164 extends through an opening 170 in the wheel wall 84 and another opening 172 in the wheel wall 86. A support ring 174 is similarly bolted to the wheel 78 so as to provide additional support for the conductor 64 against radially outward force. The conductor 164 then is bent radially inward and extended along the wheel hub portion 82 where it is supported by means of a wedge ring 176 in proximity to the connection to the positive stud 102. The negative bus rim 68 is readily attached to the negative stud 104 by means of a short conductor 178 which is clamped to the hub portion 82 as indicated by the reference character 180.

In the completed circuit, excitation supply current flows through each phase lead 92 and the phase lead connector 142 to the radially aligned heat sink segment 112 on the bus rim 64. The supply current in each phase branch continues through the diode 46 and the series connected fuse 48 for collection at the positive bus rim 64.

The total rectified supply current flows from the rim 64 to the wheel wall 84 and through the conductor 164 and the positive stud 102 to the positive generator field conductor 96 and the generator field winding 54.

The excitation return current flows from the field 54 through the generator field conductor 98 to the negative stud 104 and the conductor 178. The return current continues through the wheel hub portion 82 and the wheel wall 86 to the negative bus rim 68. Finally, the negative return current divides into components in the various phase branches and flows through each fuse 49 and the series connected diode 47 to the heat sink segment 112 on the negative bus rim 68. The return phase currents flow from the negative heat sink segments 112 through the cross connectors 156 or 158 to the phase leads 92.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. In an excitation system for a brushless generator, said excitation system including an alternating current exciter and a rotating rectifier, wheel means supported on a shaft, said wheel means including at least two bus rims, means for insulating the bus rims from each other and from the shaft, each of said bus rims having a radially inwardly facing surface, a plurality of heat sinks mounted on said rim surfaces and insulated therefrom, at least one rectifying diode supported on each heat sink in heat transfer relation and electrical connection therewith, each diode having terminal means extending radially inward, fuses mounted on the bus rims in longitudinal alignment with the heat sinks, one terminal of each fuse being electrically connected to the bus rim and another terminal of each fuse being connected to the terminal means of the adjacent diode, leads for connection to said alternating current exciter extending longitudinally on said shaft and secured thereto, generally radial conductors connecting said leads to said heat sinks, and means supported on the shaft for making electrical connection to said bus rims.

2. In an excitation system for a brushless generator, said excitation system including an alternating current exciter and a rotating rectifier, wheel means supported on a shaft, said wheel means including at least two bus rims, means for insulating the bus rims from each other and from the shaft, each of said bus rims having a radially inwardly facing surface, a plurality of heat sinks mounted on said rim surfaces and insulated therefrom, at least one rectifying diode supported on each heat sink in heat transfer relation and electrical connection therewith, each diode having terminal means extending radially inward, fuses mounted at the end of each bus rim in longitudinal alignment with each heat sink, said fuses extending generally radially inwardly from the bus rims, one terminal of each fuse being electrically connected to the bus rim, longitudinal conductors connecting another terminal of each fuse to the terminal means of the adjacent diode, leads for connection to said alternating current exciter extending longitudinally on said shaft and secured thereto, generally radial conductors connecting said leads to said heat sinks, and means supported on the shaft for making electrical connection to said bus rims.

3. An excitation system as defined in claim 2 and including a capacitor connected between at least some of said heat sinks and the bus rims on which they are supported.

4. In an excitation system for a brushless generator, said excitation system including an alternating current exciter and a rotating rectifier, a pair of rectifier wheels supported on a shaft and insulated therefrom, each of said wheels having a radial wall portion and having a cylindrical rim portion extending in one direction longitudinally from the wall portion, the rim portions of the two wheels extending in opposite direction so that the wheels are in spaced back-to-back relation on the shaft, a plurality of heat sinks mounted on the internal cylindrical surfaces of said rim portions of both wheels and insulated therefrom, at least one rectifying diode supported on each heat sink in heat transfer relation and electrical connection therewith, each diode having terminal means extending radially inward, fuses mounted at the outer end of the rim portion of each wheel substantially in longitudinal alignment with the heat sinks, one terminal of each fuse being connected to the rim portion and another terminal of each fuse being connected to the terminal means of the adjacent diode, a plurality of insulated conductors extending longitudinally through openings in the wall portions of both wheels for electrically connecting heat sinks on one wheel to corresponding heat sinks on the other wheel, leads for connection to said alternating current exciter extending longitudinally on said shaft and secured thereto, radial conductors connecting said leads to said heat sinks of at least one of the wheels, and conductors supported on the shaft for making electrical connection to the wall portion of each of the wheels.

5. An excitation system as defined in claim 4 in which the fuses are mounted in radial position on the end surfaces of the rim portions with one terminal of each fuse in electrical contact with the rim portion, with longitudinal conductors for connecting another terminal of each fuse to the terminal means of the adjacent diode, and means for supporting said longitudinal conductors.

6. An excitation system as defined in claim 4 in which a plurality of capacitors are supported on the internal cylindrical surface of the rim portion of each wheel, said capacitors being disposed adjacent at least some of said heat sinks and each capacitor being electrically connected between the adjacent heat sink and the rim portion.

References Cited

UNITED STATES PATENTS

| 3,283,219 | 11/1966 | Keady | 317—234 |
| 3,223,862 | 12/1965 | Webb | 310—68 |
| 3,145,314 | 8/1964 | Becker | 310—68 |
| 3,030,531 | 4/1962 | Lessmann | 310—68 |
| 2,897,383 | 7/1959 | Barrows | 310—68 |
| 2,972,711 | 2/1961 | Sorkin | 317—234 |

FOREIGN PATENTS

| 367,238 | 3/1958 | Switzerland. |
| 373,460 | 11/1963 | Switzerland. |

MILTON O. HIRSHFIELD, *Primary Examiner.*

J. D. MILLER, *Examiner.*